United States Patent Office 3,640,994
Patented Feb. 8, 1972

3,640,994
DISAZO DYE SALTS
Horst Harnisch, Cologne, Buchheim, Germany, assignor to Farbenfabriken Bayer Aktiengesellschaft, Leverkusen, Germany
No Drawing. Filed Apr. 30, 1969, Ser. No. 820,671
Claims priority, application Germany, May 9, 1968,
P 17 69 328.6
Int. Cl. C09b 31/06
U.S. Cl. 260—191                             3 Claims

ABSTRACT OF THE DISCLOSURE

Dye salts of the formula

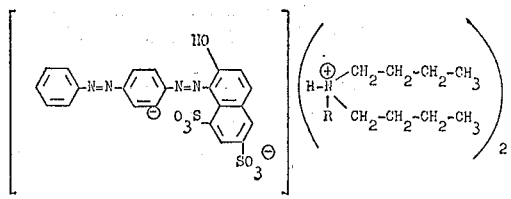

in which R is hydrogen or alkyl with 1–4 carbons are produced for use in bulk coloring of lacquers and organic synthetic materials especially polypropylene.

---

The object of the present invention comprises dyestuffs of the formula

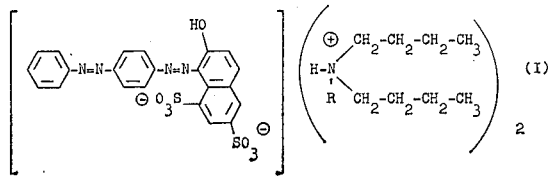

in which R represents hydrogen or a lower, straight-chain alkyl radical,
as well as their production and use for the colouring of lacquers and organic synthetic materials.

The dye salts of the Formula I are produced by reacting an aqueous solution of the dyestuff of the formula

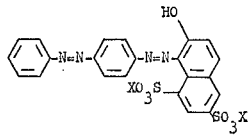

in which X stands for hydrogen or for an alkali metal atom,
with amines of the formula

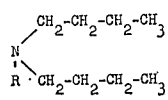

in which R has the same meaning as above, or their salts in a molar ratio 1:2.

Examples of amines of the Formula III are the following: di-n-butylamine, N-methyl-di-n-butylamine, N-ethyl-di-n-butylamine and tri-n-butylamine.

The amines of the Formula III are advantageously used in the form of their water-soluble salts, for example, in the form of acetates, hydrochlorides or sulphates. The reaction temperature is chosen in such a way that the dye salts (I), which are hardly soluble in water, are precipitated in a crystalline form capable of being readily isolated. The most advantageous precipitation temperature ranges from about 40–80° C., preferably from about 60–70° C. Isolation takes place expediently after cooling to room temperature in customary manner by suction-filtration.

On account of their solubility in alcohol, the new dye salts of the Formula I are suitable for the colouring of lacquers and organic synthetic compositions. It is surprising that they are especially suitable for the bulk dyeing of polypropylene. As is known, only those dyestuffs are suitable for the bulk dyeing of polypropylene which, besides having a sufficient solubility and migration stability in the substrate, also possess an extremely great heat resistance. Azo dyestuffs have normally not these properties; they are generally not stable to migration and have the tendency of thermal disintegration under the conditions of the extrusion process as is shown, for example, in German published patent specification No. 1,247,635. It was, therefore, not to be expected that the dyestuffs according to the invention are thermally sufficiently stable to withstand the high thermal stress associated with the extrusion process.

The dye salts of the Formula I are very readily soluble in polypropylene and completely migration-stable therein. Transparent bulk colourings which are fast to abrasion and light are obtained in brilliant red shades which are distinguished by great clarity.

The dyes are incorporated into the polypropylene in usual manner; generally amounts of about 0.02–2% being used for this purpose. Furthermore, on account of the good solubility in polypropylene, substantially higher dye concentrations are also compatible and it is therefore possible to prepare in this way with advantage polypropylene dye concentrates.

Within the scope of the present application, the term "polypropylene" comprises synthetic compositions which predominantly consist of polypropylene, particularly those of stereoregular polypropylene.

The parts given in the following examples are parts by weight.

EXAMPLE 1

44.5 parts of the coupling product obtained from p-aminoazo-benzene and 2 - naphthol-6,8-disulphonic acid (disodium salt) are dissolved at 70° C. in 800 parts water and mixed with 16 parts glacial acetic acid.

22 parts di-n-butylamine are dissolved, while cooling, in 23 parts glacial acetic acid and the solution is diluted with water to give 220 parts. The amine solution thus prepared is slowly run, while stirring, into the dyestuff solution kept at 70° C. by heating, the mixture is subsequently heated at 70° C. for a further 15 minutes and then cooled to 20° C. The crystalline precipitate thus formed is filtered off with suction, washed with 100 parts 2% acetate of a 2% di-n-butylamine solution and dried at 80° C. in a vacuum.

52 parts of a red dye salt of melting point 217–219° C. are obtained.

When, instead of di-n-butylamine, equivalent amounts of tri-n-butylamine, N-methyl-di-n-butylamine or N-ethyl-di-n-butylamine are used, red dye salts are likewise obtained.

EXAMPLE 2

0.2 parts of one of the dye salts described in Example 1 are mixed with 100 parts finely divided polypropylene. The mixture is kneaded at 180–220° C. in a screw extruder to give a homogeneous coloured mass which is extruded through a die head provided with a slot die. There are obtained ribbons of a bright, brilliant-yellowish red, transparent colouring which is fast to bleeding, abrasion and light.

EXAMPLE 3

0.5 parts of a dye salt described in Example 1 are mixed with 100 parts of a finely divided polypropylene. The mixture is kneaded at 210° C. in a screw extruder to give a homogeneous coloured mass which is extruded at 280° C. through a spinneret plate. Brillant red coloured filaments are obtained, the colouring of which is transparent and fast to abrasion and light.

EXAMPLE 4

0.5 parts of the di-n-butylamine dye salt described in Example 1 are dissolved within 20 minutes, while shaking, in 100 parts of a nitrocellulose lacquer which consists of 10.7 parts nitrocellulose, 2.5 parts dibutyl-phthalate, 2.5 parts benzyl-butyl-phthalate, 5.8 parts butanol, 26.5 parts ethanol, 26 parts acetone and 26 parts ethylene glycol monoethyl ether. A cellulose acetate foil is lacquered by applying this solution by pouring. In this way a transparent, brilliant red coloured lacquer with good fastness properties is obtained.

I claim:
1. Dye salts of the formula

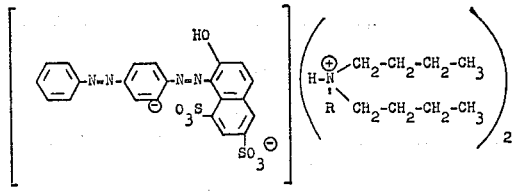

in which R represents hydrogen or a, straight-chain alkyl radical having 1–4 carbons.
2. Dye salt of claim 1 wherein R is H.
3. Dye salt of claim 1 wherein R is n-butyl.

References Cited
UNITED STATES PATENTS 2,095,077   10/1937   Payne _____ 260—501.21
2,130,668   9/1938   Gunther _____ 260—501.21

CHARLES B. PARKER, Primary Examiner

D. M. PAPUGA, Assistant Examiner

U.S. Cl. X.R.

260—41; 106—288